United States Patent
Hed et al.

(10) Patent No.: US 6,926,197 B2
(45) Date of Patent: Aug. 9, 2005

(54) DISPOSABLE AND BIODEGRADABLE PAPER CUP

(76) Inventors: Aharon Zeev Hed, 12 Wagon Trail, Nashua, NH (US) 03062; Richard Pavelle, 23 Berkshire Dr., Winchester, MA (US) 01890

(*) Notice: Subject to any disclaimer, the term of this patent is extended or adjusted under 35 U.S.C. 154(b) by 0 days.

(21) Appl. No.: 10/317,707

(22) Filed: Dec. 12, 2002

(65) Prior Publication Data

US 2004/0112949 A1 Jun. 17, 2004

(51) Int. Cl.⁷ .............................................. B65B 3/00
(52) U.S. Cl. ................................... 229/403; 229/5.84
(58) Field of Search ................. 229/584, 403; 228/62.12, 62.18, 62.2, 62.22

(56) References Cited

U.S. PATENT DOCUMENTS

| | | | |
|---|---|---|---|
| 1,814,671 A | * 7/1931 | Dufour | 229/5.5 |
| 2,661,889 A | 12/1953 | Phinney | |
| 2,853,222 A | * 9/1958 | Gallagher | 229/402 |
| 3,220,595 A | * 11/1965 | Edwards | 206/519 |
| 3,642,550 A | * 2/1972 | Doll | 156/78 |
| 3,908,523 A | 9/1975 | Shikaya | |
| 4,993,580 A | 2/1991 | Smith | |
| 5,092,485 A | 3/1992 | Lee | |
| 5,205,473 A | 4/1993 | Coffin | |
| 5,660,326 A | * 8/1997 | Varano et al. | 229/403 |
| 5,685,480 A | 11/1997 | Choi | |
| 5,736,093 A | * 4/1998 | Slat | 264/513 |
| 5,769,311 A | * 6/1998 | Morita et al. | 229/403 |
| 5,772,111 A | 6/1998 | Kirch | |
| 5,775,577 A | 7/1998 | Titus | |
| 5,950,917 A | 9/1999 | Smith | |
| 5,964,400 A | 10/1999 | Varano | |
| 6,126,584 A | 10/2000 | Zadravetz | |
| 6,186,394 B1 | * 2/2001 | Dees et al. | 229/122.34 |
| 6,253,995 B1 | 7/2001 | Blok | |
| 6,364,149 B1 | * 4/2002 | Smith | 220/592.2 |
| 6,586,075 B1 | * 7/2003 | Mitchell et al. | 428/159 |
| 6,598,786 B1 | * 7/2003 | Guo | 229/403 |

* cited by examiner

*Primary Examiner*—Tri M. Mai
(74) *Attorney, Agent, or Firm*—Herbert Dubno (57) ABSTRACT

A drinking cup has sandwiched between an inner paper liner and an outer paper shell a ridge structure which has its ridges running peripherally, i.e. perpendicular to the axis, e.g. in the form of corrugations, a mesh or a cell network and can be partially filled with a phase-transition material to maintain a maximum temperature at the exterior of the shell for a given hot temperature of the liquid within the cup.

3 Claims, 4 Drawing Sheets

DISPOSABLE AND BIODEGRADABLE PAPER CUP

FIELD OF THE INVENTION

Our present invention relates to disposable and biodegradable paper cups, and more particularly to cups adapted to contain hot or cold liquids, to maintain the temperature of the liquid contained in the cup over an extended period of time and to protect the hand of the user from scalding by the heat of the contents of a cup.

BACKGROUND OF THE INVENTION

For many years, the issue of people being scalded by hot coffee at fast food establishments has made the headlines and the courts. Since people desire hot coffee, one solution has been to provide coffee in cups that act as thermal insulators so that the user's hand is not burnt while holding the hot cup. Styrofoam (polystyrene) is a common material used in coffee cups for this purpose. However, many people do not like polystyrene for at least two reasons. It is not biodegradable, and some of the material is ingested with the coffee. There is therefore a need for disposable cups, particularly for hot drinks, which are environmentally friendly, to replace Styrofoam disposable cups.

In the early 1990s, the Java Jacket (http://www.javajacket.com/) was introduced which is an insulating coffee cup sleeve made from waffle-textured cardboard that wraps around a standard paper cup (U.S. Pat. No. 5,425,497). Starbucks introduced a similar product and cites U.S. Pat. No. 5,205,473. Both work fairly well as long as the coffee temperature is not too hot. The materials are, of course, biodegradable.

In U.S. Pat. No. 5,222,656 Carlson introduces a design similar to 473 based on a tubular insulating sleeve from a felt-like material. The Carlson cup does not appear to have been marketed.

In U.S. Pat. No. 5,667,135 Schaefer describes a thermal insulating sleeve for drink cups made from a preform which includes a plurality of circumferentially spaced-apart rows of generally longitudinally oriented and off-set slits. The slits thereby allow the sleeve to expand circumferentially when portioned on a portion of the beverage cup side wall and, by virtue of such circumferential expansion, thereby form the insulative honeycomb structure therearound.

There are many other patents in this category that were issued despite the fact that Shikaya, U.S. Pat. No. 3,908,523, foresaw the need for such a sleeve in 1975. He describes a sleeve "disposed around the peripheral surface of the cup-like body, with the sheet member being corrugated to provide a plurality of "concavo-convex" flutes, whereby air compartments are provided between the peripheral surface of the cup-like member and the inner surface of the sheet member, comprises forming the sheet member by cutting, from a planar sheet, a planar blank having a width in excess of the peripheral length of the circular bottom of an inner cup member and a length substantially equal to the height of the side wall of the inner cup member. The opposite ends of the planar blank are then united in overlapped relation to form a circular cross-section sleeve constituting an outer member and, after such uniting, the blank is formed with "concavo-convex" flutes to form a structure whose peripheral surface is corrugated. The inner and outer members are then telescoped to form a composite liquid-tight cup with heat insulating air passages extending upwardly along the outer surface of the side wall of the inner cup member".

However, insulating sleeves for paper cups involve maintaining inventory of an additional item for each serving and increases the cost of delivering a cup of hot drink to the customers. There is therefore a need for a sleeveless solution to delivering hot drinks to consumers.

More recently, Insulair (www.insulair.com) has essentially taken a Java Jacket and placed it between an inner and outer paper wall (U.S. Pat. No. 5,363,982). The resulting cup has the appearance of a normal paper coffee cup while providing some thermal insulation as well as being biodegradable. Yet, even Insulair's cup does not provide enough insulation, and when boiling water is poured in the cup it is too hot to handle and the hot drinks cool off too rapidly. There are three main problems with the Insulair approach. Since the corrugate is free (not adhered to the two bracing layers, or laminates) it provides none of the mechanical advantages of corrugated structures. Furthermore, the thermal insulation advantage of the "air pockets" within the corrugation channels are negated because the corrugations are vertical. In such structures, air within each channel creates heat exchanging flows (as hot air moves up and cold air down) diminishing the thermal insulating properties of air. Last, the airspace created by the corrugations is in free contact with the ambient air, which is colder than the air in said air pockets, and thus allows a process of soaking ambient air into channels and cooling the hot drinks.

In U.S. Pat. No. 5,685,480 Choi describes a disposable insulated drinking cup that includes an inner liner, an outer annular shell, and an air-filled spacer between the liner and shell. Both the corrugated wall and backing sheet are of thin-wall construction to maximize the air volume and insulation properties of the spacer. The spacer includes a corrugated wall adhered to a backing sheet, and by sealing the bottom of the structure to bottom disk, within a channel, overcomes the shortcoming of Insulair's corrugated structure. However, said channel reduces drastically the stackability of the cups (having a radius larger than the bottom radius of the external shell). Furthermore, Choi's corrugations are vertical, as are Insulair's corrugations, and thus promotes within the air channels air movement due to thermally induced differential air densities between the cold bottom of the cup and the warmer top. It should also be mentioned, that in order to practice Choi's structures, the cup's overall wall thickness is typically about 0.12 inch (0.02 inch each for the inner liner and outer shell and a radial thickness of the spacer of 0.08 inch).

There is therefore a need for a low cost insulating cup that is relatively thin, and does not rely for its thermal insulation on vertical air columns. Specifically, there is a need for a disposable and biodegradable cup that can maintain an initial thermal gradient on its wall of better than 34° F. and can maintain such a hot drink above 120° F. for more than 75 minutes. For the purpose of this specification, we define the hot pouring fluid temperature as 1920–202° F., and the "tepid temperature" under which a hot drink is no longer pleasant to consume as 120° F. We also define the hand comfort temperature, or the maximum temperature that will not cause hand discomfort as 162° F.

The present invention provides a new class of paper cups satisfying said requirements by having wall constructions providing better thermal insulation than the current state of the art and made from materials that are biodegradable and less expensive to manufacture than Insulair's cups.

OBJECTS OF THE INVENTION

It is the main object of the present invention to provide disposable paper cups that have improved thermal performance. The performance includes that the outer wall will be cold enough while a hot fluid is contained within the cup. In this instance, the meaning of "cold enough" is about 160° F., when the fluid inside the cup is at about 192° F., or an initial thermal gradient on the cup's wall that is at least 32° F. It is yet another object to extend the period of time before the fluid within the cup cools under about 120° F. from its initial pouring temperature. These main objectives are supplemented by a general objective that the cups have a very high degree of biodegradability.

It is yet another object that said cups manufacturing costs would not be much more expensive than current state of the art disposable cups.

A further object is to provide a disposable and biodegradable drinking cup capable of protecting the hand of the user from scalding and discomfort even when a cup contains the hottest beverage.

Still another object of this invention is to provide a drinking cup which can obviate the drawbacks of earlier drinking cups.

SUMMARY OF THE INVENTION

As mentioned in the background, state of the art improved paper cups contain an inner layer of corrugated paper, having the corrugations more or less in parallel to the cup's axis, or in essence vertical. Furthermore, cold air from around the cup can leak in the space between the inner and outer walls, where the corrugate is embedded, creating a source of dynamic cooling. In one embodiment of the invention, using an intermediate layer between the inner and outer wall that has lateral corrugations, perpendicular to the cup's axis alleviates these shortcomings. These corrugations create, in essence, a series of rings parallel to a main circle of the cone which determines the cup shape (paper cups are in essence truncated cones). As a result, to the extent that air movement occurs within said corrugations, such movements does not soak cold air from outside the cup, nor does it create longitudinal eddies that tend to act as a heat transfer medium, between warmer (bottom of the cup) and colder (top of the cup) regions in the cup.

An improved embodiment of the invention involves the formation of isolated pockets of air between the inner and outer wall of the disposable paper cup. This is achieved by providing a mesh array between the inner and outer wall of said disposable cup. A variety of form factors and methods of creating said array are contemplated for said mesh as further described below.

In yet another embodiment of the invention, the ridges or the mesh structures are an integral part of one of the two layers, as a relief array on said layer. These can be imparted either by printing said structures using a high viscosity ink, they could be pressed on, or even silk screened on as further detailed below. The same structure can also be pre-laminated and then formed into cups from the compound sheet of paper.

A further embodiment of the invention involves the use of organic foams; for instance biodegradable foamed polyethylene/starch, laminated between the internal and external walls of the cup. Here as well, the stock from which the paper cup is made can be pre-laminated, or the foam can deposited on one of the layers and the consolidation of the cup from the three elements (inner layer, foam and outer layer) carried out during the cup final forming process.

Finally, in yet another embodiment of the invention, the air pockets mentioned above are filled with a material having a fusion temperature under the "holding comfort temperature", or the "scalding temperature"(about 160° F.), and above the "tepid temperature" (120° F.), for instance a fusion temperature of about 155° F. This material has the impact of assuring that the external wall temperature never exceeds its melting point, and thus the scalding temperature, and initially is slowing down the cooling rate of the fluids by reducing drastically the thermal gradient over the wall of the cup. Once this material is molten, however, heat losses are somewhat greater than when said cells are air-filled.

More particularly, the objects are attained in a disposable biodegradable drinking cup which comprises:

a frustoconical liner composed of a biodegradable sheet material with an internal lining of a liquid-impervious material;

an outer frustoconical shell surrounding the liner and connected therewith at least at a mouth of the cup at a top thereof and at a bottom of the cup, the shell and the liner defining a space between them between the bottom and the top of the cup;

a bottom member sealed to the liner at the bottom of the cup and closing an interior thereof; and a biodegradable structure in the space comprised of ridges running peripherally and transverse to an axis of the cup and obstructing flow of air in the space from the bottom to the top, thereby limiting loss of heat from the interior and heating of the interior from an exterior of the cup, the ridges being spaced apart from top to bottom in the space.

The structure can be a corrugated sheet having corrugations running peripherally and transverse to the axis and bonded to at least one of the liners and the shell. The corrugations can extend substantially continually around the periphery of the liner or can be staggered.

According to a feature of the invention the ridges can be hardened imprints of a viscous ink forming a printed pattern.

In another aspect of the invention the disposable biodegradable drinking cup can comprise:

a frustoconical liner composed of a biodegradable sheet material with an internal lining of a liquid-impervious material;

an outer frustoconical shell surrounding the liner and connected therewith at least at a mouth of the cup at a top thereof and at a bottom of the cup, the shell and the liner defining a space between them between the bottom and the top of the cup;

a bottom member sealed to the liner at the bottom of the cup and closing an interior thereof;

a biodegradable structure in the space comprised of cells; and a phase transition substance undergoing a phase transformation between a temperature of a substance within the interior of the liner and a maximum permissible temperature at the exterior of the shell at least partially filling the cells.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
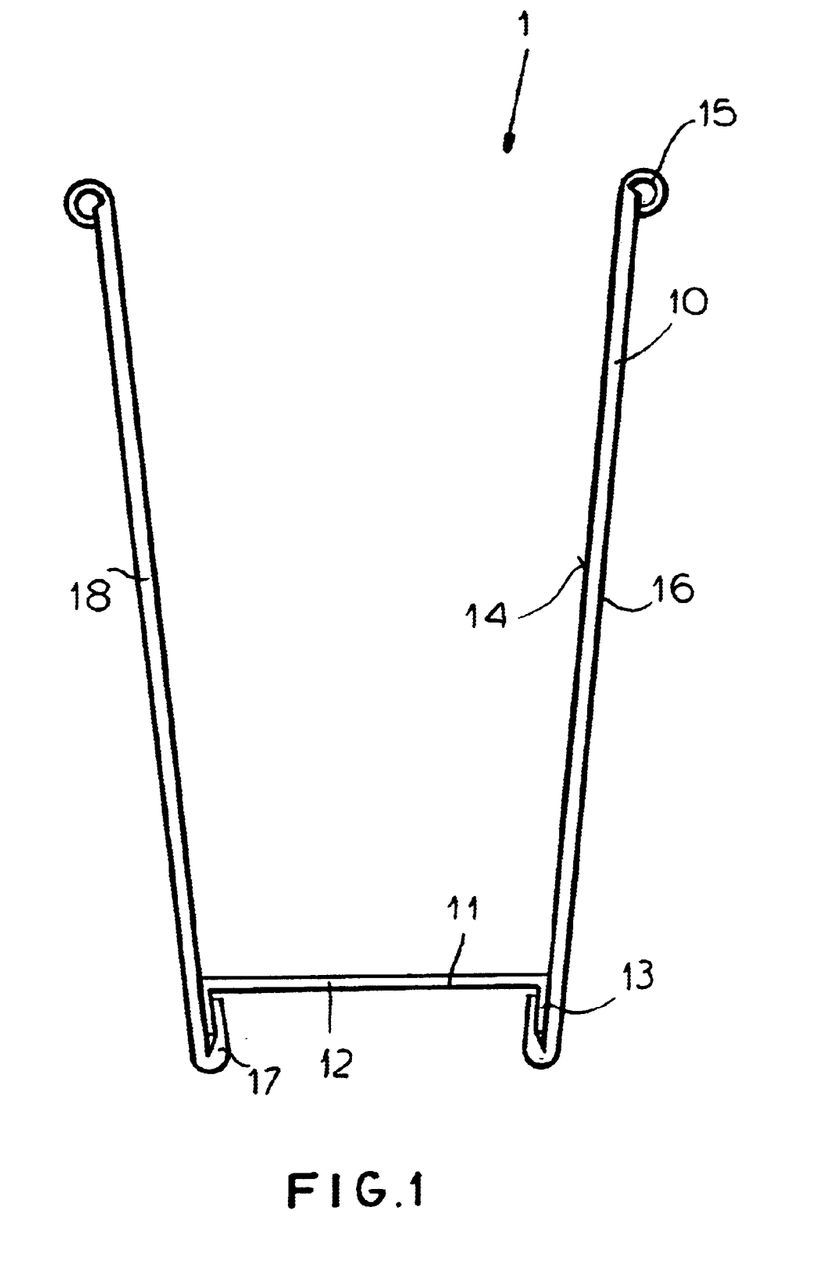
FIG. 1 is a schematic description of a cross section through a typical cup of the present invention.

In FIG. 1 is shown a cross section of a typical cup, 1, of the present invention. The cup consists of two major elements, a cup wall, 10, which is essentially a truncated cone, and a sealing bottom, 11, which has the form of a disc 12, deformed to provide a sealing rim, 13. The sealing bottom, its construction and methods of sealing it to the inside of the bottom of the truncated cone, are all well known in the prior art, and not part of the present invention. Suffice it to say that in most cases, since the inner wall, 14 of the cup as well as the surface of the bottom disc, 12 are coated with a very thin layer of polyethylene (to waterproof the paper), heat sealing (adhesion) is typically practiced. Similarly, the curling of the top edge of the cup, 15, to provide a smooth drinking edge is also prior art and has been practiced for many years in the industry. The present invention relates only to various advantageous structures of the truncated conical wall, 10, and thus issues related to the bottom disk and the curled top are not essential to the present invention. Similarly, in some embodiments, and in the prior art, the bottom segment, 17, of the conical wall, 10, is bent over the sealing ring, 13, of the bottom disc, 12, while in, other embodiments, no such bending is necessary.

The truncated conical wall, 10, in the present invention, has a general structure of a compound material, consisting of an internal laminate, 14, in contact with the hot drink within the cup, and an external laminate, 16, in contact with the consumer's hand. The internal laminate, is often coated on the surface facing the hot liquid with a very thin (about 1 thousandth of an inch or less) layer of polyethylene, rendering the paper stock from which the laminate 14 is made water impervious. This is an integral part of the prior art. The space, 18, between the two laminates, and its treatments is the main subject of the present invention. Typically, single walled hot drink disposable cups are made of paper stock about 14 to 18 thousandths of an inch thick. In the present invention, the internal laminate, 14, is typically between 6 to 10 thousandths of an inch, the external laminate, 16, is between 4 to 8 thousands of an inch, and the spacing between the two laminates is between 12 to 24 thousandths of an inch, resulting in wall thickness ranging from 24 to 42 thousandths of an inch, or 0.6 to just above 1 mm.

In one embodiment of the invention, which is comparable in cost to the existing Insulair system but has better thermal performance, and in some variants a somewhat better mechanical performance, a corrugated spacer, having its corrugations essentially perpendicular (rather than parallel to, as in Choi and Insulair cases) to the cup axis is used. Such an insert between the internal wall (which will hereinafter be referred to as the "liner", 14) and external wall (which will hereinafter be referred to as the "shell" 16), can take a number of different forms. As mentioned above, the liner's surface facing the hot drink is laminated with a very thin polyethylene layer not shown.

Figure 2A:
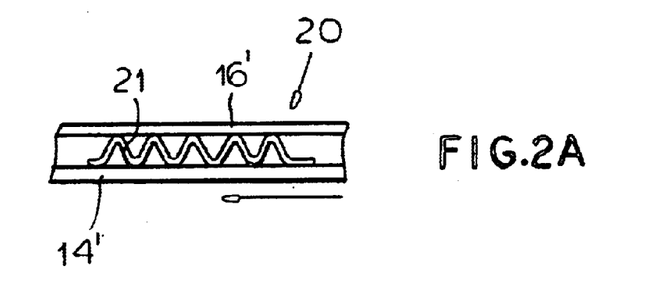
FIG. 2A to FIG. 2E are top views of cup liners on which spacing approaches are applied.
Figure 3A:
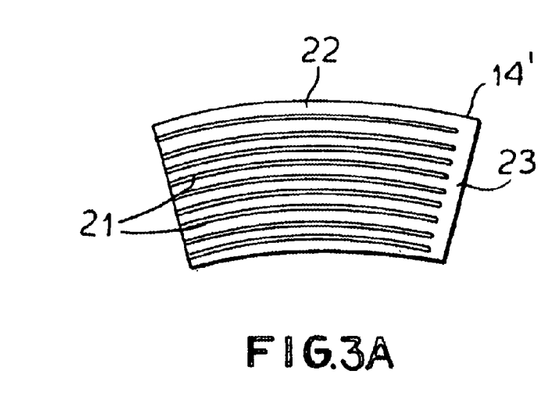
FIG. 3A to FIG. 3D are cross sections through the cup wall in a few of the embodiments.

In FIG. 2A we show a cross section through the cup's wall, 20, the arrow points in the direction of the cup's axis. The corrugated insert, 21, is adhered to the liner 14', and then the shell, 16', can be cemented thereon. In production, one can choose a variety of approaches to create the corrugated laminate. In some embodiments the corrugated insert is precut into a segment of a ring (so that when it is rolled into a truncated cone, it fits perfectly), and is cemented to the outer surface of the liner, 14'. In FIG. 3A is shown a top view of the liner's, 14', with the corrugations, 21, on it. Note that the corrugations are parallel to the upper and lower circumference of the ring segment. In that manner, when rolled into a truncated cone shape, these corrugations are lateral, or perpendicular to the axis of the cone (rather then vertical as are all other state of the art corrugated cup structures). In one variation of this embodiment, the corrugate is actually cemented first to the liner, 14', then the preprinted external shell, 16' is cemented on the corrugate, and then the assembly undergoes the same mandrel based process practiced right now. In this approach, the cup's lip area, 22, and the linear overlap area, 23, for final adhesion of the cup are left free of the lateral corrugate.

A slightly less effective variant of the lateral corrugation embodiment simply uses a linearly corrugated insert. The advantage is that large rolls of the corrugated assembly can be produced before the ring segments are die cut from the sheet. There are two minor disadvantages. The first is that now the corrugates are not perfectly perpendicular to the cup's axis, but are curved, and thus a limited amount of dynamic heat exchange can occur (yet much less than in the current state of the art, where the corrugates are parallel to the cup's axis). The second disadvantage is that, typically, the corrugate will now cover the whole surface of the segmented ring from which the cup's wall is formed. Thus, while rolling the lip, 15, the corrugate is crushed, and residual undulation on the lip structure is apparent. Similarly, the seam created when cementing one side of the ring segment to the opposing side (to form the truncated cone on a mandrel), will be thicker than on current state of the art cups. These are matters of consumer preference rather than thermal performance, and if such disadvantages needs to be addressed, one can simply die cut out the lip area 22 and the seam area 23 with the external shell to clear those areas for the lip rolling and seam adhesion processes respectively.

Figure 2B:
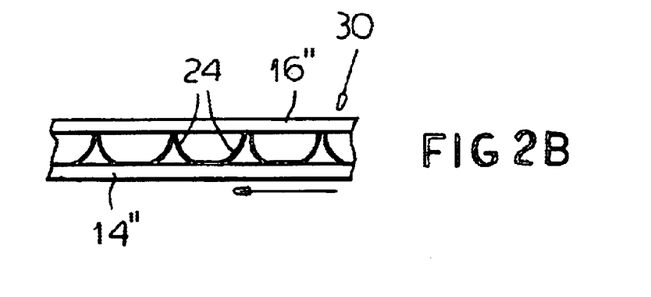

In another variant of this embodiment, in lieu of actually using a corrugate as an insert between the liner and the shell, the corrugations are printed on the shell with a high viscosity ink, in the pattern shown as corrugates 21 in FIG. 3A. Namely, a set of parallel circle segments concentric with the upper rim of the ring segment that will become the liner, 14', are printed thereon. These corrugates have a height as desired for the spacer, typically, in the 12 to 24 thousandths of an inch range. A cross section, 30, of an embodiment created by a printing process is shown in FIG. 2B, where, on the liner, 14", a series of ridges 24 are printed, or silk screened, in an appropriate pattern (as shown in FIG. 2A), and then, after the ridges have been allowed to cure and harden, the shell, 16" is adhered to the ridges. Since the ink is expected to be viscous, but still flowing, the cross section of the ridges shows the side sagging of the relief. It is clear that when practicing this embodiment, a continuous process of printing on a large sheet (or roll) of liner paper, followed by curing and then adhering, thereto the shell, in a "roll to roll" fashion, making the process quite cost effective. It is preferred that the shell already be printed with the logo desired by the customer prior to the step of adhering it to the liner with the ridges thereon. When practicing the ridges printing process, one would leave space free of ridges the lip area, 22, and the seam area, 23, (see FIG. 2A) thus facilitating the final assembly of the cup. Furthermore, leaving the lip and seam area ridges free, will yield cups that possess the look and feel of current state of the art disposable cups. It should be clear that in this approach, attention should be paid to correctly index the shell sheet to the liner sheet in order to assure that the print on the shell is well centered. Special features on the print can be used in the subsequent process of die cutting the ring segments from the composite formed in the process, so as to assure that the seam and lip areas are well positioned relative to desired end geometry.

Sand filled acrylate inks are useful as the ridge forming structure, since they cure rapidly in air and hold the cross section deposited in the printing process. One can also use for that purpose air curable trimethylsiloxy terminated polydimethylsiloxane-based polymers.

In essence, using a high viscosity, rapidly solidifying, ink or adhesive, or even an adhesive loaded with fine particulate (fine sand) will result in a pattern of raised ridges on the laminate as shown in FIG. 3A. One can even use thermally or UV curable biodegradable polymers for that purpose. The specific material best suited for the purpose is determined taking into account issues of cost, mechanical properties as well as extent of biodegradability.

Above we described a process by which the relief printing was applied to stock of the liner 14" material, and then the shell 16" stock was adhered thereto. It should be clear that the process can be reversed and the ridges can be applied first to the shell material and then the liner is adhered thereto. If the external shell needs to allow very high quality printing, it is best to apply the relief structure to the liner, allowing high quality printing on the shell, followed by, indexing, adhesion, die cutting and assembly on a mandrel.

It should also be clear that the formation of the composite from which the cups are formed need not necessarily be from rolls of stock paper, but large sheets of the raw materials can be used as well.

Figure 2C:
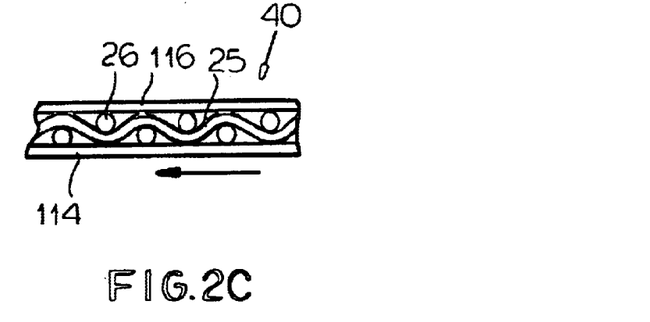
Figure 3B:
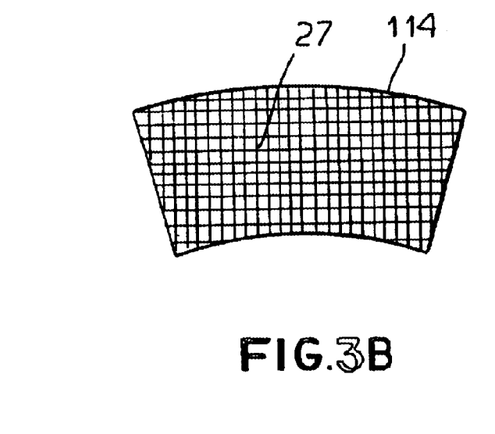

In yet another embodiment of the invention, in lieu of using a corrugate as an insert, a mesh structure is used providing in essence a rectilinear array between the liner and the shell. For instance, in FIG. 2C we show a cross section through the wall, 40, of a disposable cup, where the insert is a woven mesh and where the cross section passes through one of the vertically aligned fibers, 25, of the mesh. The horizontal fibers, 26, are shown as circular cross section. In the context of this discussion "horizontal" and "vertical" are vectors associated with the cup's axis, the former being perpendicular and the latter parallel to the axis. FIG. 2C was drawn to demonstrate the principle of this structure. It should be understood that in practice the mesh spacing (between two parallel fibers) is much larger than the fiber's diameter or cross section. Furthermore, it should also be understood, that flattened fibers are better suited for this application than purely cylindrical fibers. As described above, the mesh structure can be adhered first to the liner, 114, then the shell 116 is cemented thereto. In FIG. 3B, a top view of the mesh, 27 adhered to the liner 114, already cut as a ring segment, (that can be bent on a mandrel into a cup) is shown. It is clear that such a structure can be pre-assembled in large sheets or rolls, whereby the mesh insert is between the liner 114 and the shell 116 raw materials, and the die cutting of the ring segments from which the cups are assembled is carried out after the composite laminate has been produced.

The mesh can be made from woven material, like cotton or jute, or any other appropriate material. The mesh insert need not necessarily be a woven structure. Other structures that create an array of isolated cells are somewhat preferred to a woven array, since in a woven structure, air migration between cells, and thus increase in apparent thermal conductivity, is not completely inhibited. Such other arrays can be formed from foams, elastic foams or other biodegradable polymers. Such forming can involve pressing, molding, casting and any other processes that will result in an array having the desired thickness and very low mass to surface ratio, and will provide between the liner and the shell, an array of air pockets that are isolated from each other.

As was the case with the horizontal corrugates, when the array covers the whole space between the liner and shell, the lip and seam of the final cups have an appearance that is slightly different than current state of the art cups. As with the corrugate mentioned above, if customer acceptance considerations requires clearing a lip and a seal space (the equivalent of the spaces 22 and 23 in FIG. 3A), that can be achieved as suggested above. As was also the case with the lateral corrugate mentioned above, the pattern of the mesh, can be printed on with a high viscosity medium, rather than be an independent insert. The cross section would then look as is shown for the corrugate in FIG. 2B, with the exception that a cross section perpendicular to the one depicted in FIG. 2B will be the same.

Figure 3C:
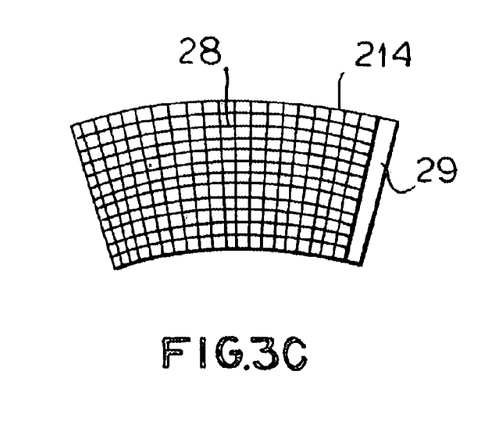

It should be clear that when printing on the liner an array structure of air cells, other geometries can be considered as well. For instance in, FIG. 3C we show a liner 214, on which an array, 28, of cells is created from radial ridges and equally spaced circle segments concentric with the rims of the liner. The forming of the composite paper, serving as stock from which the cup are formed is completed by cementing on top of the printed array, the external shell paper. As above printing and die cutting of the whole structure precedes the step of forming the cup on a appropriate mandrel as in the prior art, and the treatment of the lip structure and the seam can be addressed by leaving the appropriate seam are, 29, and if desired a lip area (not shown) free of the array.

Figure 3D:
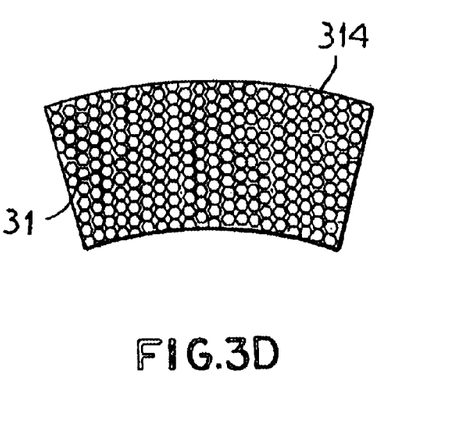

In yet another embodiment of the present invention the paper stock from which the cups are formed is a composite honeycomb structure. For instance, in FIG. 3D, we show a liner, 314, on which such a honeycomb structure, 31, is adhered. The honeycomb structure preferred thickness is between 12 to 24 thousandths of an inch (0.3 to 0.6 mm), actual thickness depending strongly on consumer preference issues. The hexagon side size should be about 10 to 25 times the thickness (height) of the honeycomb structure.

Typically, normal paper cup stock is about 12 to 18 thousandths of an inch (0.3 to 0.55 mm) thick, thinner stock being used for cold drink cups and thicker stock for hot drinks. However, when using the honeycomb structure proposed, the inner and outer laminate paper stock can be much thinner and still retain as much, if not more, mechanical strength as the normal thick paper. The use of thinner stock should compensate for the additional cost of the honeycomb structure. The honeycomb structure should be of much lesser weight than Insulair's corrugate, and thus be competitive with that prior art as well.

As is the case with the rectilinear array of air pockets, the air pockets created within each hexagonal chamber between the two laminates, are completely isolated from other air pockets, and thus heat transfer is controlled by the extremely low thermal conductivity of air, rather than by convective heat losses, as in the vertical corrugate system of Insulair and other corrugated cups.

Figure 2D:
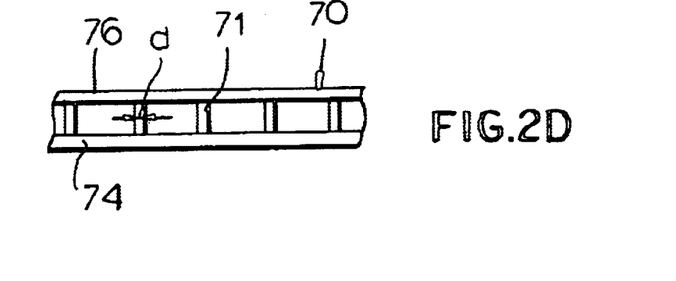
Figure 4A:
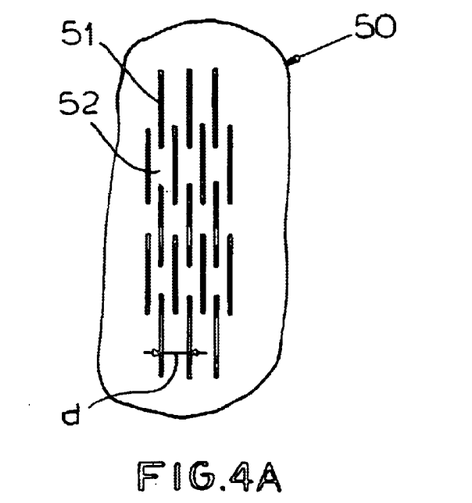
FIG. 4A and FIG. 4B describe detail of the formation of a honeycomb structure to be used as a spacer in one embodiment.
Figure 4B:
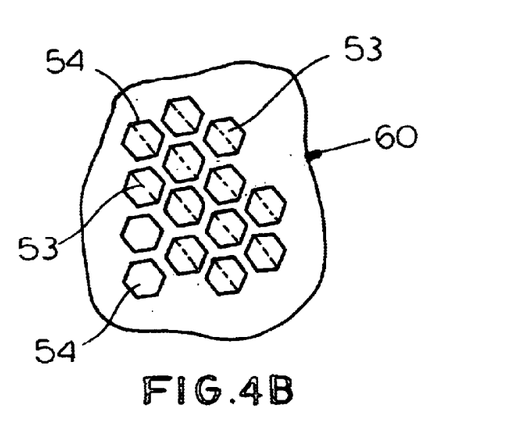

The honeycomb structure can be cheaply produced by using an appropriate stock (paper, or even thin wood laminate, whichever is cheaper) having a thickness equal to the honeycomb's wall height, as mentioned above between 12 to 24 thousandths of an inch. In FIG. 4A, we show a portion of the raw stock, 50, from which the hexagonal insert can be formed. The stock is slit with a series of longitudinal slits, 51, each three times the honeycomb's hexagonal structures' side, separated by one length, 52, of the side. Neighboring rows of such slits are separated by the desired honeycomb wall's thickness, d, (shown in FIG. 4A as 2d between second rows of slits) and displaced relative to each other, so that the space between slits in a given line is facing the middle of two neighboring slits in the two neighboring lines of slits. When the slit sheet is now stretched laterally, a honeycomb structure, 60, as shown in FIG. 4B is produced. Since one can easily choose to make the hexagonal wall 1/10, or smaller, of the hexagonal periods (the distance between the centers of two adjacent hexagons), the raw materials area from which the hexagonal insert is made is about 1/10 the area covered by the hexagonal structure. Note that the dotted lines, 53, in the center of the hexagons, 54, represent the space where the slit was, prior to lateral stretching of the slit stock, 50. In FIG. 2D, we show a cross section through the wall, 70, of a cup assembled from a honeycomb composite stock as described herein. As can be seen, the honeycomb structure, 71, has the height which is the thickness of the original slit stock, 50 of FIG. 4A, and the thickness of each wall shown is the spacing, d, between adjacent rows of slits. The honeycomb structure is cemented between the liner 74 and the shell 76, thus providing both a flexible and mechanically strong structure, having a plurality of isolated air pockets serving as excellent thermal insulation.

In production, the honeycomb stock can be first adhered first to the liner, or the internal wall of the finished cup. The external, wall, or the shell, on which full color printing is desired, is printed first, then laminated onto the honeycomb structure. After the structure is cured, it is cut to size and assembled as cups on appropriate mandrels as in the current process and as suggested above. One need not worry about compressing the honeycomb structure (crush it) during the final cementing of the cup, nor during the rolling of the cups top. Because the honeycomb structure is quite thin (12 to 24 thousandths of an inch) the resulting stock should be flexible enough to be bent into the truncated cone forming the cup. As in prior embodiments, if customer acceptance issues arise, one can provide for clearing the lip and seal area prior to final assembly on the mandrel.

The bottom part of the cup is assembled and cemented in place in the same manner as practiced now. If desired, a honeycombed composite as used for the truncated cone part of the cup may be used to slightly improve the thermal performance of the cup, by reducing heat leakage from the bottom of the cup.

One can easily demonstrate that by changing the slits pattern in the stock 50, other array geometries are feasible. For instance, if the spacing between parallel slits (the array's wall thickness) is equal to the spacing between slits in a line of slits, the stretched array will be composed of squares having each a side that is half the length of the slits. Such other non-hexagonal arrays are contemplated as an integral part of the present invention.

One should also realize that an hexagonal array structure can also be obtained by the various printing, or silk screening approaches described earlier for spacers or inserts between the liner and shell that are either arrays, or curved ridge simulating corrugations, and such methods of obtaining a cup walls having a plurality of isolated air pockets between the liner and the shell, are contemplated as well. As above, when using printed hexagonal array ridges structures as described herein, the lip area of the cups as well as the vertical area of cementing overlap are left ridge free, facilitating the final assembly on existing mandrel type assembly equipment.

Figure 2E:
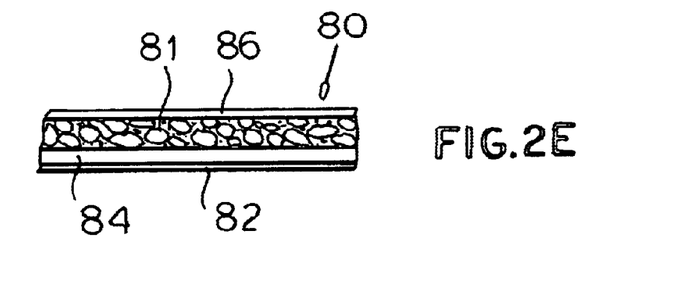

In yet another embodiment of the invention, FIG. 2E, to provide a somewhat greater mechanical strength, (and thus allow reduction in the thickness of the internal and external laminates), but somewhat reduced thermal performance, the concept of an array of isolated air cells is extended to foams. In essence, a composite wall 80 consists of a liner 84, and a shell 86 having therebetween an organic foam (such as a foamed polyethylene/starch). The production of such a laminate can take the form of painting a very thin (about 1 thousandth of an inch) solution of starch with a plasticizer and appropriate foaming agents (all well known in the prior starch foaming art), liner stock, laminating on top of that layer the shell stock, and then passing the laminate through a heated restricting structure. The restricting structure consists of two parallel plates about 20 to 40 thousand of an inch apart (the desired end thickness of the laminate), heated to between 180° C. to 250° C., where polymerization and foaming of the foam occur. The distal end of the restricting structure is kept colder, to cool the foamed starch in place, and thus prevent the still hot and plastic foam from forming undesired bulges in either the liner or shell. When heated, due to the foaming agent action, the thin layer of starch expands drastically (to fill the desired space, so as to form a foam about 12 to 24 thousandths of an inch thick). When practicing this embodiment, it is best to apply the thin polyethylene layer, 82, to provide waterproofing of the liner, 84, after the hot foaming process is complete.

In yet another embodiment of the invention, the space between the liner and the shell is filled or partially filled with a "phase transition" material. A "phase transition material" refers to a material that has a relatively large heat of fusion associated with the transition from the solid to the liquid phase. The melting point is selected to be such that it is slightly under the "scalding" point, or about 162° F., a preferred melting point is in the range of 150° F. to 160° F. The rationale is that until the phase transition material has melted (using heat from the hot liquid), the temperature thereof cannot increase above the melting point, thus assuring that the outside of the cup never reaches the scalding point. Furthermore, by reducing the thermal gradient when the hot liquid is hottest, the thermal losses are reduced (the thermal loss is proportional to both the thermal gradient and the thermal conductivity of the wall). It should be emphasized that this approach results in overall losses (at temperatures under the scalding point and toward the tepid point of 120° F.) that are greater than the air filled array, due to the better thermal conductivity of the wax relative to air. Clearly, this embodiment simply involve using any of the rectilinear arrays or hexagonal arrays described above, and prior to adhering the shell thereof, filling the arrays of cell, with the "phase transition" material. Paraffins, of the general formula $C_nH_{n+2}$, with 28<n<40 are suitable as well as other waxes designed to have a specific melting point in the range of 150° F. to 160° F. It is important to assure that shell is well adhered to the ridges of the array, to assure that upon melting, the wax, or paraffin does not migrate out of its respective cell.

In some embodiment of the invention, the cells within the array are only partially filled with the wax and the balance is left with air, to reduce overall wall thermal conductivity. In yet another embodiment, only the middle third annular portion of the array is filled with the phase transition material, leaving the top and bottom part of the cup with air in the cells, thus reducing overall the walls thermal conductivity, while assuring the middle section of the cup external wall's temperature never reaches the scalding point, 162° F.

Having described in detail some of the preferred embodiments of the present invention, it will now be obvious to those skilled in the art that a plurality of modifications, combinations of the various concepts (such as arrays filled with biodegradable foam) and variations thereof an be made therein without departing from the scope of the invention as defined in the following claims.

We claim:

1. A disposable biodegradable drinking cup comprising:
    a frustoconical liner composed of a biodegradable sheet material with an internal lining of a liquid-impervious material,
    an outer frustoconical shell surrounding said liner and connected therewith at least at a mouth of the cup at a top thereof and at a bottom of the cup, said shell and said liner defining a space between them between the bottom and the top of the cup;
    a bottom member sealed to said liner at the bottom of said cup and closing an interior thereof; and
    a biodegradable structure in said space comprised of ridges running peripherally and transverse to an axis of said cup and obstructing flow of air in said space from the bottom to the top, thereby limiting loss of heat from said interior and heating of said interior from an exterior of the cup, said ridges being spaced apart from top to bottom in said space, said ridges being hardened imprints of a viscous, ink forming a printed pattern.

2. The disposable and biodegradable drinking cup defined in claim 1 wherein said hardened imprint are provided on one of, an independent layer between the liner and the shell, the outer surface of the liner or the inner surface of the shell.

3. A disposable biodegradable drinking cup comprising:
    a frustoconical liner composed of a biodegradable sheet material with an internal lining of a liquid-impervious material;
    an outer frustoconical shell surrounding said liner and connected therewith at least at a mouth of the cup at a top thereof and at a bottom of the cup, said shell and said liner defining a space between them between the bottom and the top of the cup;
    a bottom member sealed to said liner at the bottom of said cup and closing an interior thereof; and
    a biodegradable structure providing isolated air cells within essentially an entire space between the liner and the shell, thereby limiting loss of heat from said interior and heating of said interior from an exterior of the cup, said air cells being spaced apart from top to bottom in said space, said air cells are formed by printing on an outer surface of said liner or on an inner surface of said shell, a pattern of elevated ridges from a sand-filled ink.

* * * * *